United States Patent
Lindoff et al.

(10) Patent No.: US 10,244,454 B2
(45) Date of Patent: *Mar. 26, 2019

(54) COMMUNICATION DEVICE AND METHOD THEREIN FOR HANDOVER IN WIRELESS COMMUNICATION NETWORK

(71) Applicant: Telefonaktiebolaget L M Ericsson (publ), Stockholm (SE)

(72) Inventors: Bengt Lindoff, Bjarred (SE); Magnus Astrom, Lund (SE); Johan Eker, Lund (SE); Johan Nilsson, Hollviken (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/652,778

(22) PCT Filed: Jun. 2, 2015

(86) PCT No.: PCT/EP2015/062237
§ 371 (c)(1),
(2) Date: Jun. 16, 2015

(87) PCT Pub. No.: WO2016/192775
PCT Pub. Date: Dec. 8, 2016

(65) Prior Publication Data
US 2017/0142629 A1    May 18, 2017

(51) Int. Cl.
*H04W 36/30*    (2009.01)
*H04W 36/08*    (2009.01)
*H04W 36/00*    (2009.01)

(52) U.S. Cl.
CPC .......... *H04W 36/30* (2013.01); *H04W 36/08* (2013.01); *H04W 36/0083* (2013.01)

(58) Field of Classification Search
CPC ......... H04W 36/0094; H04W 36/0016; H04W 4/005; H04W 36/30; H04L 43/16; H04L 43/0864; H04L 43/10
See application file for complete search history.

(56) References Cited

U.S. PATENT DOCUMENTS

| 6,490,452 B1 | 12/2002 | Boscovic et al. |
| 6,681,099 B1 * | 1/2004 | Keranen ........... H04W 64/00 342/357.25 |

(Continued)

FOREIGN PATENT DOCUMENTS

| EP | 2117170 A1 * | 11/2009 | ........... H04L 1/0021 |
| EP | 2117170 A1 * | 11/2009 | ........... H04L 1/0021 |

(Continued)

OTHER PUBLICATIONS

PCT International Search Report, dated Jan. 22, 2016, in connection with International Application No. PCT/EP2015/062234, all pages.

(Continued)

*Primary Examiner* — Lan-Huong Truong
(74) *Attorney, Agent, or Firm* — Leffler Intellectual Property Law, PLLC

(57) ABSTRACT

A communication device and method therein for handover from a serving cell to a target cell in a communication network are disclosed. The communication device is configured to obtain a first round trip time between the communication device via the network node and a server and obtain a second round trip time between the communication device via a target node in the target cell and the server. The communication device is further configured to send a request for handover from the serving cell to the target cell based on at least the first round trip time and the second round trip time.

20 Claims, 3 Drawing Sheets

(56) References Cited

U.S. PATENT DOCUMENTS

| | | | |
|---|---|---|---|
| 8,155,051 B2* | 4/2012 | Kim | H04L 47/10 370/318 |
| 9,019,854 B2 | 4/2015 | Jonsson et al. | |
| 9,642,036 B2* | 5/2017 | Xiao | H04W 28/0289 |
| 2002/0094820 A1 | 7/2002 | Keranen et al. | |
| 2005/0192011 A1* | 9/2005 | Hong | H04W 36/12 455/440 |
| 2006/0240813 A1* | 10/2006 | Baek | H04W 36/02 455/422.1 |
| 2009/0325568 A1 | 12/2009 | Tabery et al. | |
| 2010/0323704 A1* | 12/2010 | Tailor | H04W 36/32 455/438 |
| 2011/0319071 A1 | 12/2011 | Beppler et al. | |
| 2012/0076016 A1* | 3/2012 | Robbins | H04L 43/50 370/252 |
| 2012/0177002 A1* | 7/2012 | Faucher | H04W 36/02 370/331 |
| 2012/0327797 A1 | 12/2012 | Siomina et al. | |
| 2014/0064249 A1 | 3/2014 | Lee et al. | |
| 2014/0086123 A1 | 3/2014 | Deivasigamani et al. | |
| 2014/0286313 A1 | 9/2014 | Fu et al. | |
| 2014/0362713 A1 | 12/2014 | Agarwal et al. | |
| 2015/0067819 A1* | 3/2015 | Shribman | H04L 67/06 726/12 |

FOREIGN PATENT DOCUMENTS

| | | |
|---|---|---|
| JP | 2004129164 A | 4/2004 |
| JP | 2006324945 A | 11/2006 |
| JP | 2007005981 A | 1/2007 |
| JP | 2008072451 A | 3/2008 |
| JP | 2008538691 A | 10/2008 |
| JP | 2009535968 A | 10/2009 |
| JP | 2011166583 A | 8/2011 |
| JP | 2011530895 A | 12/2011 |

OTHER PUBLICATIONS

PCT Written Opinion, dated Jan. 22, 2016, in connection with International Application No. PCT/EP2015/062234, all pages.

Non-Final Office Action dated Jun. 15, 2017, in connection with U.S. Appl. No. 14/651,660, 24 pages.

Notice of Allowance, dated Aug. 27, 2018, in connection with U.S. Appl. No. 14/651,660, 30 pages.

Japanese Office Action dated Nov. 9, 2018, in connection with Japanese Application No. 2017561664, 4 pages.

English language translation of Summary of Japanese Office Action dated Nov. 9, 2018, in connection with Japanese Application No. 2017561664, 2 pages.

Korean Office Action dated Jan. 3, 2019, in connection with Korean Application No. 10-2017-7037384, 5 pages.

English language translation of Korean Office Action dated Jan. 3, 2019, in connection with Korean Application No. 10-2017-7037384, 4 pages.

Japanese Office Action dated Nov. 16, 2018, in connection with Japanese Application No. 2017-561916, 3 pages.

English language translation of Summary of Japanese Office Action dated Nov. 16, 2018, in connection with Japanese Application No. 2017-561916, 2 pages.

\* cited by examiner

COMMUNICATION DEVICE AND METHOD THEREIN FOR HANDOVER IN WIRELESS COMMUNICATION NETWORK

TECHNICAL FIELD

Embodiments herein relate to a communication device and a method therein. In particular, they relate to performing handover from a serving cell to a target cell based on latency for a communication device in a wireless communication network.

BACKGROUND

Wireless communication devices may be referred to as mobile telephones, user equipments (UE), wireless terminals, mobile terminals, mobile stations, cellular telephones, smart phones, sensors and actuators with wireless capability, laptops, tablets and phablets, i.e. a combination of a smartphone and a tablet with wireless capability, as well as wireless modems in cars etc. Wireless communication devices are enabled to communicate or operate wirelessly in a Heterogeneous wireless communication system comprising multiple networks or Heterogeneous Networks (HetNet) with access nodes or access points, such as a cellular communications network comprising Second/Third Generation (2G/3G) network, 3G Long Term Evolution (LTE) network, Worldwide interoperability for Microwave Access (WiMAX) network, Wireless Local Area Network (WLAN) or WiFi etc.

The wireless communication device in the present context may be, for example, portable, pocket-storable, hand-held, computer-comprised, vehicle-mounted mobile devices, or any machine-type device, enabled to communicate voice and/or data via an access node with another entity, such as another communication device or a server in the wireless communication system.

5G, i.e. 5th generation mobile networks or 5th generation wireless systems denotes the next major phase of mobile telecommunications standards beyond the current 4th Generation (4G)/International Mobile Telecommunications-Advanced (IMT-Advanced) standards. In a 5G wireless communication system, machine-to-machine communication or Machine-Type Communication (MTC) is one of the major research projects. In order to maintain robust control loop functions in mission and/or time-critical MTC devices, such as communication devices used for in e.g. manufacturing, process industry, automotive or medical applications, communications with higher reliability and lower latency than previously supported in legacy systems e.g. 2nd Generation (2G), 3rd Generation (3G), 4G etc., are required. Message delays over the wireless link as well as a roundtrip time between an MTC device and its destination, e.g. an application server, must be kept low. Typical requirements are, e.g. a maximum message delay of no more than 1 ms and packet error probability of no more than 1e-9. In order to meet such requirements, strict requirements are put on the physical layer to not introduce transport block errors, since in 3G LTE and 4G each retransmission add 8 ms to the message delay. Moreover, interruption of the wireless link must be minimized.

When cellular networks are used to transmit data for high-reliability use cases, e.g. manufacturing, process industry, automotive or medical applications in mission-critical MTC as described above, the robust control loop function requires that message delays over the wireless link must be kept low, in addition to keeping the jitter at a minimum. Depending on the application, the tolerable round-trip delays may not exceed a few milliseconds and predictable timing is also of importance. However, existing wireless systems have in contrast been designed mainly with other use cases in mind, such as voice and internet access, where a latency of 50-200 ms is acceptable, which is however too long for the mission-critical MTC.

Therefore there is a need for improved methods and apparatus for low latency applications in a wireless communication network.

SUMMARY

It is an object of embodiments herein to provide an improved method and communication device for low latency applications in a wireless communication network.

According to a first aspect of embodiments herein, the object is achieved by a method performed in a communication device for handover from a serving cell to a target cell in a communication network. The communication device obtains a first round trip time between the communication device via a serving node in the serving cell and a server. The communication device further obtains a second round trip time between the communication device via a target node in the target cell and the server. The communication device then sends to the serving node, a request for handover from the serving cell to the target cell based on at least the first round trip time and the second round trip time.

According to a second aspect of embodiments herein, the object is achieved by a communication device for handover from a serving cell to a target cell in a communication network. The communication device is configured to obtain a first round trip time between the communication device via a serving node in the serving cell and a server. The communication device is further configured to obtain a second round trip time between the communication device via a target node in the target cell and the server. The communication device is configured to send to the serving node, a request for handover from the serving cell to the target cell based on at least the first round trip time and the second round trip time.

By sending a request for handover from the serving cell to the target cell based on at least the first round trip time between the communication device via the serving node and a server, and the second round trip time between the communication device via a target node and the server, the target node with shorter round trip time can be selected, and as a result, the latency for time or mission critical message communication may be reduced.

Thus, embodiments herein provide an improved method for transmission of critical data packets or messages with reduced latency in a wireless communication network by performing handover based on round trip times in a communication device.

BRIEF DESCRIPTION OF THE DRAWINGS

Examples of embodiments herein are described in more detail with reference to attached drawings in which.

DETAILED DESCRIPTION

In order to develop higher reliability and low latency of communications for mission-critical-MTC, one of the key design challenges is to achieve very low latency in the order of 1 ms for data transmission so that new application cases such as real time control of industrial equipment or remote controlled vehicles may be enabled.

As discussed above, the existing wireless systems have too long latency. Further, in some scenarios the amount of data to be transmitted in mission-critical-MTC is not huge, e.g. in industrial automation and remote control applications, messages to be transmitted only contains a few words. Hence in these applications, extreme Signal to Noise Ratios (SNRs) over a radio interface or link might not be required compared to the low latency requirements. For example, a first target node or access point which has strong signals for a certain radio access technology (RAT) may have longer ping time or round trip time to the application server, while another second target node which has weaker signals, but still sufficient for the current application, may have much shorter ping time or round trip time. According to the existing handover procedures, a handover to the first target node may be initiated. Therefore cell selection and reselection or handover procedures which mainly based on SNRs in current communication networks may not be optimized for low latency applications.

Figure 1:
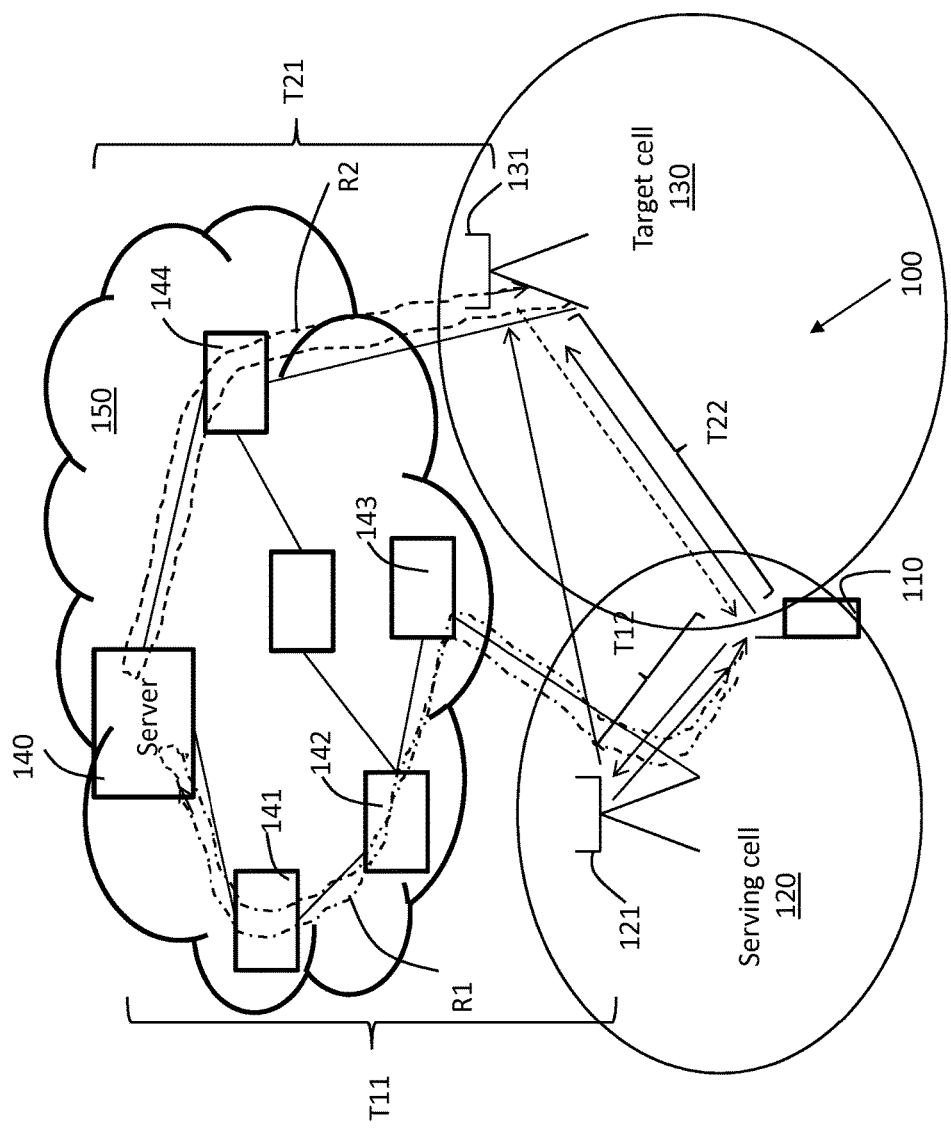
FIG. 1 is a diagram illustrating an example of a wireless communication network.

FIG. 1 depicts an example of a wireless communication network 100 in which embodiments herein may be implemented. The wireless communication network 100 may comprise one or more wireless communication networks such as e.g. any 2G/3G/4G networks, Wimax, WLAN/WiFi etc.

The wireless communications network 100 covers a geographical area which is divided into cell areas or cover areas, wherein each cell area is served by a network node, also referred to as a serving network node, an access node, an access point or a base station. The wireless communication network 100 may comprise a number of cells, each cell supporting communications for a number of communication devices located therein, wherein a serving cell 120 with a serving network node 121, and a target cell 130 with a target node 131, are shown in FIG. 1.

A number of communication devices may operate in the wireless communication network 100, wherein a communication device 110 is shown in FIG. 1. The communication device 110 may, e.g. be any machine type devices with wireless communication capability, or any other radio network units capable to communicate over a radio link in a wireless communications network, e.g. a mobile terminal or station, a wireless terminal, a user equipment, a mobile phone, a computer such as e.g. a laptop, a Personal Digital Assistants (PDAs) or a tablet computer etc. The communication device 110 may communicate with the serving network node 121 in the serving cell 120 and may need to monitor other cells for various purposes, for example, to perform a handover to a neighbour cell or target cell 130.

The wireless communication network 100 may further comprise a number of servers for running different applications or services, and a number of routers for connecting the servers, wherein a server 140, and a number of routers 141, 142, 143, 144, are depicted in FIG. 1. The routers 141, 142, 143, 144 may also be servers. The server 140 and routers 141, 142, 143, 144 may be comprised in a cloud 150, which may also be referred to as a computing environment, network or system.

The communication device 110 may communicate with the server 140 for transmission and receiving data, messages and instructions etc. If the communication device 110 is a mission and/or time-critical MTC device used for communication in e.g. manufacturing, process industry, automotive or medical applications as described above, higher reliability and lower latency for the communication with the server 140 is required in order to maintain robust control loop functions.

As shown in FIG. 1, there are several routes for the communication device 110 to communicate with the server 140. A first route is indicated as a dash-dotted line denoted as R1 to the left of the FIG. 1. In the first route R1, a signal travels from the communication device 110 to the serving network node 121, through the routers 143, 142, 141 and reaches the sever 140, then travels back from the server 140, through the routers 141, 142, 143 and via the serving network node 121 to the communication device 110. The time spent for the signal traveling from the communication device 110 via the network node 121 to the server 140 and back again is defined as a first round trip time, i.e. the round trip time, or ping-time, from the communication device 110 via the network node 121 to the server 140 and from the server 140 back to the communication device 110 via the network node 121. The first round trip time comprises two parts, the first part is the time spent between the network node 121 and the server 140, denoted as T11. The second part is the time spent on the radio link between the communication device 110 and the network node 121, denoted as T12.

A second route is indicated as a dashed line denoted as R2 to the right of the FIG. 1. In the second route R2, a signal travels from the communication device 110 via the target node 131 through router/server 144 to the sever 140, then travels back from the sever 140, through router/server 144 and via the target node 131 to the communication device 110. The time spent for the signal traveling between the communication device 110 via the target node 131 and the server 140 is defined as a second round trip time, i.e. the round trip time from the communication device 110 via the target node 131 to the server 140 and from the server 140 back to the communication device 110 via the target node 131. The second round trip time comprises two parts, the first part is the time spent between the target node 131 and the server 140, denoted as T21. The second part is the time spent on the radio link between the communication device 110 and the target node 131, denoted as T22.

In some scenarios, the second round trip time may be shorter than the first round trip time although the SNR of the target node 131 is lower. In this case, a handover may be initiated.

Figure 2:
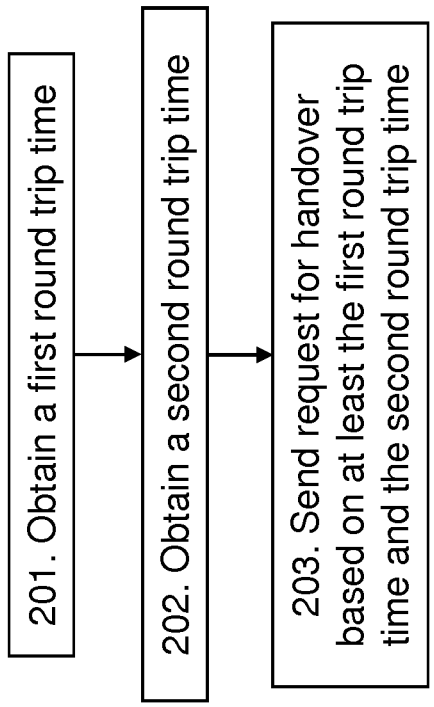
FIG. 2 is a flowchart illustrating one embodiment of a method in a communication device.

Example of embodiments of a method performed in a communication device 110 for handover from a serving cell 120 to a target cell 130 in the communication network 100, will now be described with reference to FIG. 2. The network node 121 is a serving node for the communication device 110 in the serving cell 120. The method comprises the following actions, which actions may be taken in any suitable order.

Action 201

The communication device 110 may trig a need or request for handover to a target cell, e.g. the target cell 130 when communications with the server 140 are needed. A handover event may also be triggered by the network node in any 2G/3G/4G networks by monitoring neighbor cells. The handover may be, e.g. an Inter Radio Access Technology (IRAT) handover, i.e. handover between two nodes using different carrier frequencies and different RATs, or an Intra-frequency (IF) handover, i.e. handover between two nodes using same carrier frequency and same RAT, or an Inter-frequency handover, i.e. handover between two nodes using different carrier frequency but same RAT. Here "a need" may be potential and hence made a "long" time prior to an actual handover is needed.

In order to determine if a handover is needed or which target cell to handover for the current application, the communication device 110 needs to know the round trip time to the server 140 via the network node 121 and a target node, e.g. the target node 131. Therefore, communication device 110 obtains a first round trip time between the communication device 110 via the network node 121 and the server 140.

The communication device 110 may already know the first round trip time from an earlier measurement or application procedure. In this embodiment the communication device 110 may obtain the first round trip time by collecting this information that it may have stored earlier.

According to some embodiments, the network node 121 may already know the round trip time T11 between the serving node 121 and a server 140. Usually the time spent on the radio link between the communication device 110 and the network node 121 T12 is much shorter than T11, so the communication device 110 may receive from the serving network node 121, the round trip time T11 as an estimation to the first round trip time.

According to some embodiments, the first round trip time is unknown to the communication device 110 or it needs to be updated, the communication device 110 may obtain the first round trip time through measurement by sending a ping signal via the network node 121 to the server 140 and measuring the first round trip time. The ping signal may be a ping signal according to the Internet Control Message Protocol, e.g. an ICMP-ping signal or may be a signal included in a cellular control packet, containing a latency measurement request, or any other latency measurement request.

Action 202

The communication device 110 obtains a second round trip time between the communication device 110 via a target node 131 in the target cell 130 and the server 140. There are several ways to obtain the second round trip time.

According to some embodiments, the communication device 110 sends information on the Internet Protocol (IP) address of the server 140 to the target node 131 and instructs the target node 131 to do a ping test for measuring a round trip time, i.e. T21, between the target node 131 and the server 140.

The target node 131 does a ping test and gets the round trip time T21 between the target node 131 and the server 140. Since the time spent on the radio link between the communication device 110 and the target node 131, T22, is much shorter than T21, the communication device 110 may obtain the second round trip time by receiving the round trip time between the target node 131 and the server 140 as an estimation to the second round trip time.

According to some embodiments, the communication device 110 sends information on IP address or a cell identity of the target node 131 to the server 140 and instructs the server 140 to perform a ping test for measuring a round trip time, T21, between the server 140 and the target node 131. The target node 131 may in some embodiments be identified by the cell identity, either local or global depending on the RAT etc., or by a pure IP-address, in case the communication device 110 has gotten that information when detecting the target node 131.

The server 140 does a ping test and gets the round trip time T21 between the target node 131 and the server 140. The communication device 110 may obtain the second round trip time by receiving the round trip time between the target node 131 and the server 140 as an estimation to the second round trip time.

According to some embodiments, the serving network node 121 may already know the round trip time T21 between the target node 131 and the server 140, either by receiving it from the target node 131 measured by an earlier occasion, or instructing the target node 131 to do a ping test to the server 140 and receiving the measurement result. Then the communication device 110 may receive from the serving network node 121, the round trip time between the target node 131 and the server 140 as an estimation to the second round trip time.

According to some embodiments, if the serving cell 120 and the target cell 130 does not have any backhaul connection, e.g. a handover from 2G/3G/4G networks to WiFi or WLAN, or the serving cell 120 determines that interaction with the target cell 130 is not possible, the network node 121 may configure a measurement gap, i.e. the network node 121 provides a time gap in the scheduling of the communication device 110 where no downlink or uplink scheduling occurs. The communication device 110 receives information on the measurement gap from the serving node 121 and sends a ping signal to the server 140 via the target node 131 during the measurement gap and measures the second round trip time.

According to some embodiments, the communication device 110 may not need long measurement gaps, since it has capability to have more than one connection ongoing simultaneously, e.g. via a second transmission chain. Then the communication device 110 may configure the second transmission chain to connect to the target cell 130 and may obtain the second round trip time by sending a ping signal via the target node 131 to the server 140 and measuring the second round trip time.

Action 203

After the communication device 110 have obtained the first round trip time and the second round trip time, the communication device 110 sends to the serving node 121, a request for handover from the serving cell 120 to the target cell 130 based on at least the first round trip time and the second round trip time.

By sending a request for handover from the serving cell to the target cell based on at least the first round trip time between communication device 110 via the serving node and a server, and the second round trip time between the communication device 110 via a target node and the server, the target node with shorter round trip time can be selected, and as a result, the latency for time or mission critical message communication may be reduced.

If the communication device 110 have information about acceptable latency, or a pre-determined threshold, for a current mission-critical application, the communication device 110 may compare the first round trip time and the second round trip time and choose the connection with the ping-time that fulfills that requirement.

According to some embodiments, the communication device 110 sends to the serving node 121, a request for handover from the serving cell 120 to the target cell 130 if the first round trip time is longer than the second round trip time.

According to some embodiments, the communication device 110 sends to the serving node 121, a request for handover from the serving cell 120 to the target cell 130 if the second round trip time is longer than the first round time but shorter than a pre-determined threshold and the signal quality of the target cell 130 is better than the serving cell 120.

The network node 121 may in some embodiments instruct the target node 131 to keep the route, e.g. the route R2, to the server active, i.e., not to time-out and thereby increasing latency at handover.

According to embodiments herein, if the target node 131 has a shorter round trip time to the server 140 than the serving network node 121, a handover to the target cell 130 is initiated. As a result, the latency for mission critical message communication can be reduced. The method may also apply to other scenarios, e.g. where a first target node or access point which has strong signals for a certain radio access technology (RAT) may have longer ping time or round trip time to the application server, while another second target node which has weaker signals, but still sufficient for the current application, may have much shorter ping time or round trip time, then the second target node should be chosen from the current used application perspective.

Figure 3:
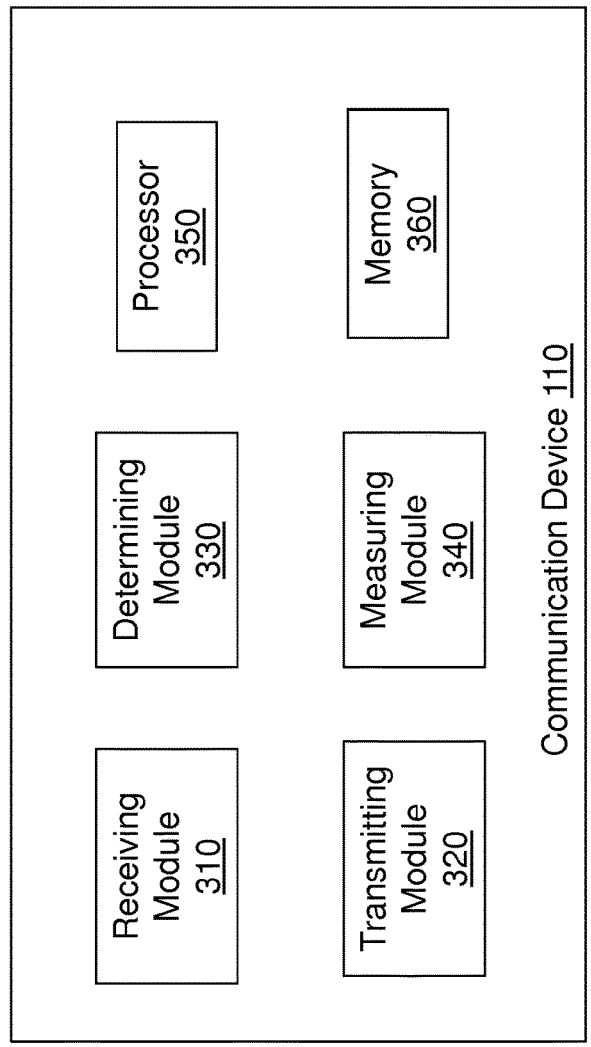
FIG. 3 is a schematic block diagram illustrating embodiments of a communication device.

To perform the method actions in the communication device 110 for handover from the serving cell 120 to the target cell 130 in the communication network 10, described above in relation to FIG. 2, the communication device 110 comprises the following circuits or modules depicted in FIG. 3. As mentioned above, the wireless communication network 100 comprises any one or more 2G/3G/4G networks, Wimax, WLAN/WiFi etc. The communication device 110 may comprise, e.g. a receiving module 310, a transmitting module 320, a determining module 330, a measuring module 340.

The communication device 110 is configured to, e.g. by means of the receiving module 310 configured to, obtain a first round trip time between the communication device 110 via the serving network node 121 and the server 140.

The communication device 110 may already know the first round trip time from an earlier measurement or application procedure. In this embodiment, the communication device 110 may obtain the first round trip time by collecting this information that it may have stored earlier.

According to some embodiments, the network node 121 may already know the round trip time T11 between the serving node 121 and a server 140. Usually the time spent on the radio link between the communication device 110 and the network node 121 T12 is much shorter than T11, so the communication device 110 may receive from the serving network node 121, the round trip time T11 as an estimation to the first round trip time.

According to some embodiments, the first round trip time is unknown to the communication device 110 or it needs to be updated, the communication device 110 may obtain the first round trip time through measurement. The communication device 110 is configured to, by means of the measuring module 340 configured to, send a ping signal via the serving network node 121 to the server 140 and measure the first round trip time.

The communication device 110 is further configured to, e.g. by means of the receiving module 310 configured to, obtain a second round trip time between the communication device 110 via a target node 131 in the target cell 130 and the server 140.

According to some embodiments, the communication device 110 is configured to, by means of the transmitting module 320 configured to, send information on the Internet Protocol (IP) address of the server 140 to the target node 131 and instruct the target node 131 to do a ping test for measuring a round trip time, i.e. T21, between the target node 131 and the server 140.

The target node 131 does a ping test and gets the round trip time T21 between the target node 131 and the server 140. Since the time spent on the radio link between the communication device 110 and the target node 131, T22, is much shorter than T21, the communication device 110 is configured to, by means of the receiving module 310 configured to, receive the round trip time between the target node 131 and the server 140 as an estimation to the second round trip time.

According to some embodiments, the communication device 110 is configured to, by means of the transmitting module 320 configured to, send information on IP address or a cell identity of the target node 131 to the server 140 and instructs the server 140 to perform a ping test for measuring a round trip time, T21, between the server 140 and the target node 131. The target node 131 may in some embodiments be identified by the cell identity, either local or global depending on the RAT etc., or by a pure IP-address, in case the communication device 110 has gotten that information when detecting the target node 131.

The server 140 does a ping test and gets the round trip time T21 between the target node 131 and the server 140. The communication device 110 is configured to, by means of the receiving module 310 configured to, receive the round trip time between the target node 131 and the server 140 as an estimation to the second round trip time.

According to some embodiments, the network node 121 may already know the round trip time T21 between the target node 131 and the server 140, either by receiving it from the target node 131 measured by an earlier occasion, or instructing the target node 131 to do a ping test to the server 140 and receiving the measurement result. Then the communication device 110 is configured to, by means of the receiving module 310 configured to, receive from the serving network node 121, the round trip time between the target node 131 and the server 140 as an estimation to the second round trip time.

According to some embodiments, if the serving cell 120 and the target cell 130 does not have any backhaul connection, e.g. a handover from 2G/3G/4G networks to WiFi or WLAN, or the serving cell 120 determines that interaction with the target cell 130 is not possible, the network node 121 may configure a measurement gap, i.e. the network node 121 provides a time gap in the scheduling of the communication device 110 where no downlink or uplink scheduling occurs. The communication device 110 is configured to, by means of the receiving module 310 configured to, receive information on the measurement gap from the serving node 121 and is further configured to, by means of the measuring module 340 configured to, send a ping signal to the server 140 via the target node 131 during the measurement gap and measure the second round trip time.

According to some embodiments, the communication device 110 may not need measurement gaps, since it has capability to have more than one connection ongoing simultaneously, e.g. via a second transmission chain. Then the communication device 110 is configured to connect to the target cell 130 via the second transmission chain and is further configured to, by means of the measuring module 340 configured to, send a ping signal via the target node 131 to the server 140 and measure the second round trip time.

After the communication device 110 have obtained the first round trip time and the second round trip time, the communication device 110 is configured to, by means of the determining module 330 and transmitting module 320 configured to, send to the serving node 121, a request for handover from the serving cell 120 to the target cell 130 based on at least the first round trip time and the second round trip time.

If the communication device 110 have information about acceptable latency, or a pre-determined threshold, for a current mission-critical application, the communication device 110 may compare the first round trip time and the second round trip time and choose the connection with the ping-time that fulfills that requirement.

According to some embodiments, the communication device 110 is configured to, by means of the determining module 330 and transmitting module 320 configured to, sends to the serving node 121, a request for handover from the serving cell 120 to the target cell 130 if the first round trip time is longer than the second round trip time.

According to some embodiments, the communication device 110 is configured to, by means of the determining module 330 and transmitting module 320 configured to, send to the serving node 121, a request for handover from the serving cell 120 to the target cell 130 if the second round trip time is longer than the first round time but shorter than a pre-determined threshold and the signal quality of the target cell 130 is better than the serving cell 120.

Those skilled in the art will appreciate that the receiving module 310, transmitting module 320, determining module 330 and measuring module 340 described above may be referred to one module, a combination of analog and digital circuits, one or more processors, such as processor 350, depicted in FIG. 3, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The communication device 110 may further comprise a memory 360 comprising one or more memory units. The memory 360 is arranged to be used to store information, e.g. IP addresses, lists of target cells, measurements and data, as well as configurations to perform the methods herein when being executed in the communication device 110.

The embodiments herein in communication device 110 for handover from the serving cell 120 to the target cell 130 in the wireless communication system 100, may be implemented through one or more processors, such as the processor 350 in the communication device 110 together with computer program code for performing the functions and actions of the embodiments herein. The program code mentioned above may also be provided as a computer program product, for instance in the form of a data carrier carrying computer program code for performing the embodiments herein when being loaded into the communication device 110. One such carrier may be in the form of a CD ROM disc. It is however feasible with other data carriers such as a memory stick. The computer program code may furthermore be provided as pure program code on a server and downloaded to the communication device 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a communication device for handover from a serving cell to a target cell in a communication network, the method comprising:
   obtaining a first round trip time between the communication device via a serving node in the serving cell and a server;
   obtaining a second round trip time between the communication device via a target node in the target cell and the server; and
   conditionally sending to the serving node, based on a consideration of at least the first round trip time and the second round trip time, a request for handover from the serving cell to the target cell,
   wherein conditionally sending, based on a consideration of at least the first round trip time and the second round trip time, a request for handover from the serving cell to the target cell further comprises:
   sending a request for handover from the serving cell to the target cell if the first round trip time is larger than the second round trip time.

2. The method according to claim 1, wherein obtaining a first round trip time comprises:
   sending a ping signal to the server via the serving node; and
   measuring the first round trip time.

3. The method according to claim 1, wherein obtaining a first round trip time comprises:
   receiving from the serving node, a round trip time between the serving node and a server as an estimation to the first round trip time.

4. The method according to claim 1, wherein obtaining a second round trip time comprises:
   sending a ping signal to the server via the target node; and
   measuring the second round trip time.

5. The method according to claim 1, wherein obtaining a second round trip time comprises:
   receiving information on a measurement gap from the serving node;
   sending a ping signal to the server via the target node during the measurement gap; and measuring the second round trip time.

6. The method according to claim 1, wherein obtaining a second round trip time further comprises:
   sending information on Internet Protocol (IP) address of the server to the target node;
   instructing the target node to perform a ping test for measuring a round trip time between the target node and the server; and
   receiving from the target node, the round trip time between the target node and the server as an estimation to the second round trip time.

7. The method according to claim 1, wherein obtaining a second round trip time between the target node and the server further comprises:
   sending information on IP address or a cell identity of the target node to the server;
   instructing the server to perform a ping test for measuring a round trip time between the server and the target node; and
   receiving from the server, the round trip time between the server and the target node as an estimation to the second round trip time.

8. The method according to claim 1, wherein obtaining a second round trip time comprises:
receiving from the serving node, a round trip time between the target node and the server as an estimation to the second round trip time.

9. The method according to claim 1, wherein conditionally sending, based on a consideration of at least the first round trip time and the second round trip time, a request for handover from the serving cell to the target cell further comprises:
sending a request for handover from the serving cell to the target cell if the second round trip time is larger than the first round time but lower than a pre-determined threshold and a signal quality of the target cell is better than the serving cell.

10. A communication device for handover from a serving cell to a target cell in a communication network, wherein the communication device is configured to:
obtain a first round trip time between the communication device via a serving node in the serving cell and a server;
obtain a second round trip time between the communication device via a target node in the target cell and the server; and
conditionally send to the serving node, based on a consideration of at least the first round trip time and the second round trip time, a request for handover from the serving cell to the target cell,
wherein the communication device is further configured to:
conditionally send a request for handover from the serving cell to the target cell if the first round trip time is larger than the second round trip time.

11. The communication device according to claim 10, wherein the communication device is further configured to:
send a ping signal to the server via the serving node; and measure the first round trip time.

12. The communication device according to claim 10, wherein the communication device is further configured to:
receive from the serving node, a round trip time between the serving node and a server as an estimation to the first round trip time.

13. The communication device according to claim 10, wherein the communication device is further configured to:
send a ping signal to the server via the target node; and measure the second round trip time.

14. The communication device according to claim 10, wherein the communication device is further configured to:
receive information on a measurement gap from the serving node;
send a ping signal to the server via the target node during the measurement gap; and measure the second round trip time.

15. The communication device according to claim 10, wherein the communication device is further configured to:
send information on Internet Protocol (IP) address of the server to the target node;
instruct the target node to perform a ping test for measuring a round trip time between the target node and the server; and
receive from the target node, the round trip time between the target node and the server as an estimation to the second round trip time.

16. The communication device according to claim 10, wherein the communication device is further configured to:
send information on IP address or a cell identity of the target node to the server;
instruct the server to perform a ping test for measuring a round trip time between the server and the target node; and
receive from the server, the round trip time between the server and the target node as an estimation to the second round trip time.

17. The communication device according to claim 10, wherein the communication device is further configured to:
receive from the serving node, a round trip time between the target node and the server as an estimation to the second round trip time.

18. The communication device according to claim 10, wherein the communication device is further configured to:
conditionally send a request for handover from the serving cell to the target cell if the second round trip time is larger than the first round time but lower than a pre-determined threshold and a signal quality of the target cell is better than the serving cell.

19. A method performed in a communication device for handover from a serving cell to a target cell in a communication network, the method comprising:
obtaining a first round trip time between the communication device via a serving node in the serving cell and a server;
obtaining a second round trip time between the communication device via a target node in the target cell and the server; and
conditionally sending to the serving node, based on a consideration of at least the first round trip time and the second round trip time, a request for handover from the serving cell to the target cell,
wherein conditionally sending, based on a consideration of at least the first round trip time and the second round trip time, a request for handover from the serving cell to the target cell further comprises:
sending a request for handover from the serving cell to the target cell if the second round trip time is larger than the first round time but lower than a pre-determined threshold and a signal quality of the target cell is better than the serving cell.

20. A communication device for handover from a serving cell to a target cell in a communication network, wherein the communication device is configured to:
obtain a first round trip time between the communication device via a serving node in the serving cell and a server;
obtain a second round trip time between the communication device via a target node in the target cell and the server; and
conditionally send to the serving node, based on a consideration of at least the first round trip time and the second round trip time, a request for handover from the serving cell to the target cell,
wherein the communication device is further configured to:
conditionally send a request for handover from the serving cell to the target cell if the second round trip time is larger than the first round time but lower than a pre-determined threshold and a signal quality of the target cell is better than the serving cell.

* * * * *

UNITED STATES PATENT AND TRADEMARK OFFICE
CERTIFICATE OF CORRECTION

PATENT NO. : 10,244,454 B2  
APPLICATION NO. : 14/652778  
DATED : March 26, 2019  
INVENTOR(S) : Lindoff et al.

It is certified that error appears in the above-identified patent and that said Letters Patent is hereby corrected as shown below:

On the Title Page

In Item (72), under "Inventors", in Column 1, Line 1, delete "Bjarred (SE);" and insert -- Bjärred (SE); --, therefor.

In Item (72), under "Inventors", in Column 1, Line 3, delete "Hollviken (SE)" and insert -- Höllviken (SE) --, therefor.

In the Specification

In Column 4, Line 11, delete "sever" and insert -- server --, therefor.

In Column 4, Line 30, delete "sever" and insert -- server --, therefor.

In Column 4, Line 31, delete "sever" and insert -- server --, therefor.

Signed and Sealed this  
Fourth Day of June, 2019

Andrei Iancu  
*Director of the United States Patent and Trademark Office*